Sept. 20, 1960     I. M. BARASH     2,953,189
SHOCK ABSORBER

Filed Oct. 1, 1956     4 Sheets-Sheet 1

INVENTOR.
IRA M. BARASH
BY S.C. Yuter
ATTORNEY

SHOCK ABSORBER 10

INVENTOR.
IRA M. BARASH
BY S.C. Yuter
ATTORNEY

Sept. 20, 1960     I. M. BARASH     2,953,189

SHOCK ABSORBER

Filed Oct. 1, 1956     4 Sheets-Sheet 3

INVENTOR.
IRA M. BARASH
BY S.C. Yuter
ATTORNEY.

Sept. 20, 1960  I. M. BARASH  2,953,189
SHOCK ABSORBER
Filed Oct. 1, 1956  4 Sheets-Sheet 4

INVENTOR.
IRA M. BARASH
BY S.C. Yuter
ATTORNEY.

United States Patent Office 2,953,189
Patented Sept. 20, 1960

2,953,189

SHOCK ABSORBER

Ira M. Barash, 400 E. 53rd St., New York, N.Y.

Filed Oct. 1, 1956, Ser. No. 613,320

15 Claims. (Cl. 155—9)

This invention relates to shock absorbers, and more particularly to shock absorbers capable of absorbing the large amount of energy generated during impact of a fast moving craft such as occurs when a high speed aircraft crash lands.

When a modern high speed aircraft crash lands or lands on rough terrain, the vertical shock caused by the sudden impact often breaks the backs or injures the spines of its occupants. More specifically, the impact produces compression fractures in the lower parts of the vertebral column. These back injuries have been attributed to exceeding the limit of deceleration which the human body can stand in the vertical direction. Deceleration is the rate of change of velocity; that is, deceleration is determined by how fast the aircraft slows down. If the aircraft comes to an abrupt stop, the deceleration is very high. If it slows down gradually, the deceleration is lower.

The usual approach in trying to solve this problem has been to attempt to provide a shock absorber system capable of gradually absorbing the tremendous amount of energy produced during the rapid deceleration created by the impact in order to keep the peak deceleration below the limit the human body can tolerate; in other words, to try to cushion the fall. This is very difficult since the downward movement of the occupant has to be cushioned in the small space between the seat and the floor of the aircraft. This means that the occupant has to be slowed down enough so that the deceleration created upon impact with the floor is not great enough to damage the occupant's back.

A great many different types of shock absorber systems appear to be able to solve this problem. Among these are springs, air or air and oil filled pistons, elastically deformable substances such as rubber pads and blocks, inelastically deformable substances such as plastic fibers and foams, friction brakes, magnetic brakes and metal deforming apparatus such as the type which utilize the extrusion of a malleable metallic member through a hardened die.

None of these shock absorber systems can be completely successful in preventing the high rate of back injury resulting from crash landing high speed aircraft as will hereinafter be apparent.

Therefore, an object of this invention is to provide improved apparatus for minimizing or preventing the occurrence of back injuries due to the crash landing of high speed aircraft.

A more general object of this invention is to provide an improved shock absorber system to safely absorb the shock which results from the impact of a body initially moving at a relatively high speed.

Another object of this invention is to provide an improved shock absorber system capable, within the available space between the occupant and the floor of the aircraft, of keeping the peak deceleration which occurs during the impact below predetermined limits in a manner which uses the space available to the greatest advantage.

Applicant has discovered that in addition to exceeding the maximum tolerable deceleration during initial impact, there are other reasons for the relatively high rate of back injuries produced by crash landings.

One reason is the deceleration caused by repeated impacts as the crashing plane bounces along the ground. This is because subsequent impacts may be even more severe than the first impact. Usually, at the first impact, the aircraft's air speed falls below the stalling speed and consequently the lift which tends to keep it airborne is no longer present, making the second impact harder than the first.

A second reason is the exceeding of the maximum rate of change of deceleration (called rate of onset) which the human body can stand. This can be explained as follows: During the time of impact the rate of slowing down changes to a faster rate of slowing down. This change from one rate to another is called rate of onset and there is a maximum rate of onset which is tolerable by the human body.

In summary, applicant has discovered that all of the following factors have to be considered in order to prevent or minimize the chances of back injuries due to crash landing high speed aircraft;

(1) The rate of slowing down (deceleration) on impact has to be kept at or below a maximum tolerable rate.

(2) The rate of change of the rate of slowing down (rate of onset) has to be kept at or below a maximum tolerable value.

(3) In order to utilize the full energy absorption capacity of the space between the occupant and the floor of the aircraft, the shock absorber should function to provide maximum tolerable deceleration together with maximum tolerable rate of onset for the entire displacement of the occupant. In other words, upon impact the deceleration must increase as quickly as tolerable to the maximum tolerable deceleration which is thereafter maintained at that level until the occupant is close to the floor. Thereupon, the downward movement of the occupant should be halted without exceeding the maximum tolerable rate of change of deceleration. The deceleration as the occupant's downward motion ends may result in temporarily exceeding the maximum tolerable deceleration, but this is unavoidable since there is no more space to absorb the shock. But the effect of the final shock is minimized by trying to lessen the rate of onset as the occupant strikes the floor.

(4) Violent rebound or recoil after deceleration must be minimized or prevented.

(5) All of the above factors have to be influenced during subsequent impacts.

Each of these factors is affected by the invention and various features of the invention.

In accordance with the invention, a shock absorber is provided comprising a support for the occupant resiliently mounted in the craft with an energy absorption device which controls the deceleration of the support and therefore the deceleration of the occupant during impacts. After each impact, reset means returns the support and occupant to their pre-impact position and resets the energy absorption device so that deceleration is controlled during subsequent impacts.

A major feature of the invention is the energy absorption device which is designed to produce a maximum tolerable rate of onset for the usual conditions of impact. In a specific embodiment of this feature of the invention the energy absorption device comprises a malleable metallic bar which is drawn between two rollers as the support is displaced during impact. A varying lever arm (in the form of a rotating cam) causes the malleable metallic bar to be pulled through the rollers at a gradually increasing rate in order to keep the rate of onset at the maximum tolerable limit both at the beginning and end of the displacement of the support for the usual conditions of impact.

In accordance with another feature of the invention the rate of energy absorbed by the energy absorption device, and therefore the amount of deceleration which results, is made dependent on the instantaneous deceleration so that there is a constant feedback control of the energy absorption in order to prevent the deceleration from exceeding the maximum tolerable limit. In a specific embodiment of this feature of the invention the energy absorption device comprises a malleable metallic bar drawn between two spaced rollers and an accelerometer mounted on the support is responsive to the instantaneous deceleration and functions as a feedback device to control the spacing of the rollers to maintain the deceleration at or below the maximum tolerable limit.

In accordance with still another feature of the invention, means are provided for keeping the seat harness of the occupant tight during the displacement of the support upon which he sits in order to prevent injury due to the flexion and other movement of his body during impact.

An advantage of the invention is that the shock absorber may readily be designed to be self-contained so as to fit within the ejection seat of existing aircraft as well as be included in the design of future aircraft seats.

Another advantage of the invention is that the deceleration produced by the shock absorber is, up to a limit, independent of the initial velocity of the aircraft upon impact and the weight of the occupant so that the device functions properly under variable conditions of impact. This is because the shock absorber automatically reduces the velocity of the occupant at the maximum tolerable rate due to the action of the accelerometer.

Other advantages of the invention are convenience in use, easy installation, relatively low cost, and little or no maintenance. Further, there is no need for an outside power source.

While the invention has been briefly described primarily as a device for preventing human injury, it should be noted that the invention is equally useful in preventing structural damage to parts of the mobile craft itself. In addition, while the problems created by rapid deceleration have been emphasized, the invention is equally applicable to solving the problems created by rapid upward acceleration such as occurs during the take off of jet and rocket aircraft or the upward ejection of a pilot from a disabled high speed aircraft.

Other objects, features and advantages of the invention will appear in the following description which is accompanied by a drawing wherein.

Figure 1:
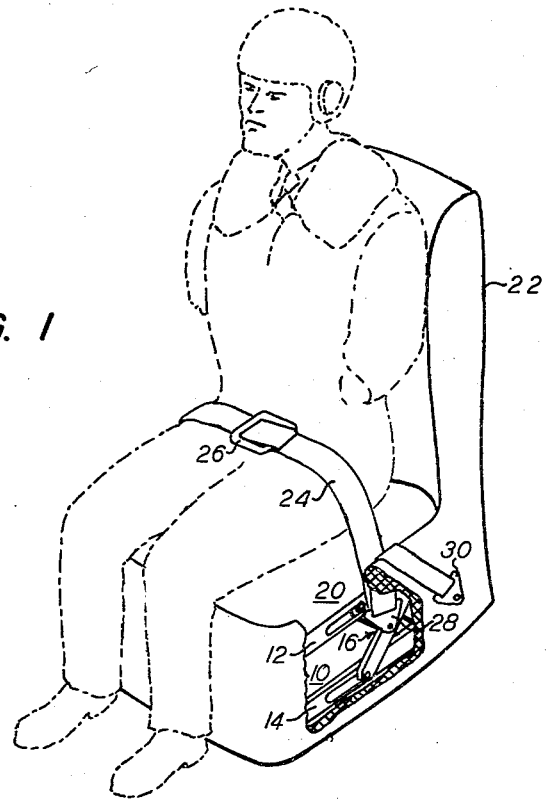
Fig. 1 is a perspective view partly broken away of a shock absorber mounted in an ejection seat and supporting a pilot, shown in dotted outline, in accordance with a preferred embodiment of the invention.
Figure 2:
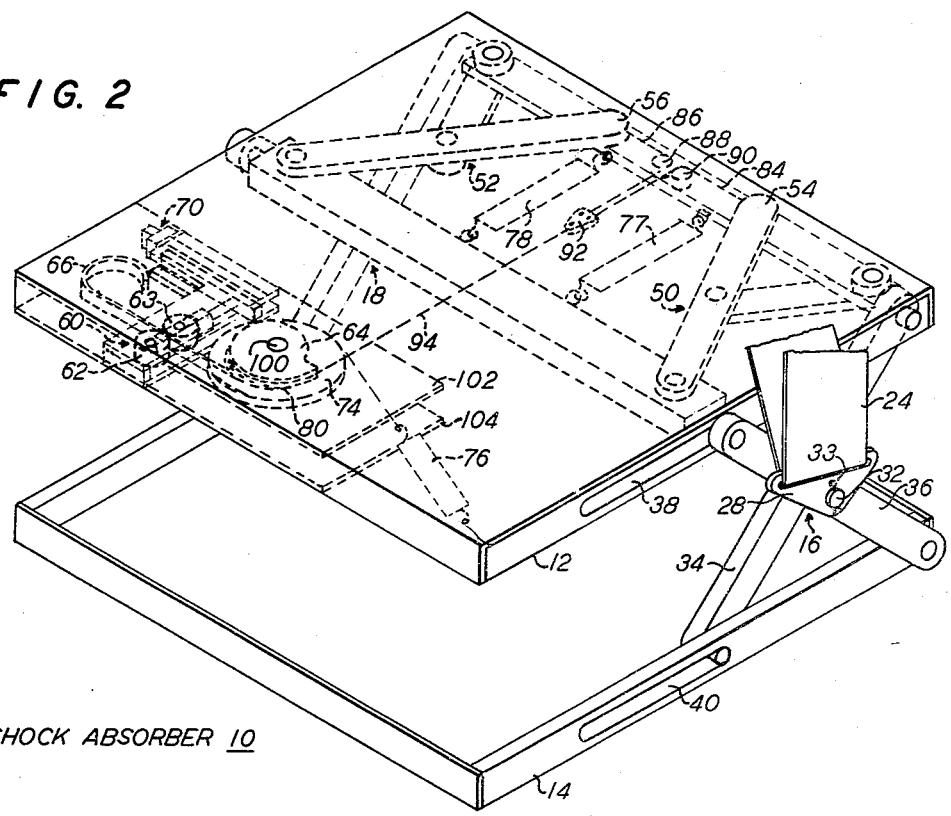
Fig. 2 is a perspective view of the shock absorber partially ilustrated in Fig. 1 showing the details in dotted outline of the energy absorption device, the accelerometer, the variable lever arm (cam) together with the reset means.

Referring to Figs. 1 and 2, the shock absorber 10 comprises an upper support 12 and a lower support 14. A pair of lever systems 16 and 18 maintains the upper and lower supports 12 and 14 in spaced relation. The shock absorber 10 is positioned beneath the pilot and may be separated from the pilot by a cushion 20 (Fig. 1) in the ejection seat 22. The shock absorber 10 replaces a filler block or the survival kit which is usually strapped beneath the pilot. The pilot is strapped to the ejection seat 22 by the lap belt 24 and buckle 26. One-half of the lap belt 24 passes through the slotted piece 28 over the edge of the ejection seat 22 and attaches to the ejection seat 22 by the connector 30. The slotted piece 28 is attached to the junction of the lever system 16 by the pivot connection 32 (Fig. 2) and the cotter pin 33. The remaining half of the lap belt 24 is similarly attached to the shock absorber 10 and the ejection seat 22 on the other side of the ejection seat 22. Thus, during impact, as the upper support 12 moves downward, the lever system 16 closes, moving the pivot connection 32 and the slotted piece 28 in a downward direction. Since the pivot connection 32 and slotted piece 28 are in the center of the lever system 16, the slotted piece 28 moves down exactly half the distance that the upper support 12 moves. Then, since the lap belt 24 shortens twice the distance the slotted piece 28 moves, the lap belt 24 shortens the exact distance that the upper support 12 moves. This is equally true for both sides of the lap belt 24. Therefore, the lap belt 24 is maintained tight around the pilot.

Each of the pair of vertical lever systems 16 and 18 comprises levers 34 and 36 movably connected at their mid-points by the pivot connection 32. The upper end of lever 36 slides in a slot 38 in the upper support 12 and the lower end of the lever 34 slides in a corresponding slot 40 in the lower support 14. The lower end of the lever 36 is pivotally connected near the corner of the lower support 14 and the upper part of the lever 34 is pivotally connected near one corner of the upper support 12. The vertical lever system 18 (not shown) on the other side of the shock absorber 10 is similarly connected between the upper and lower supports 12 and 14. A cross bar 42 is connected between the upper end of the lever 36 of the vertical lever system 16 and the upper end of the corresponding lever of the vertical lever system 18.

Figure 3:
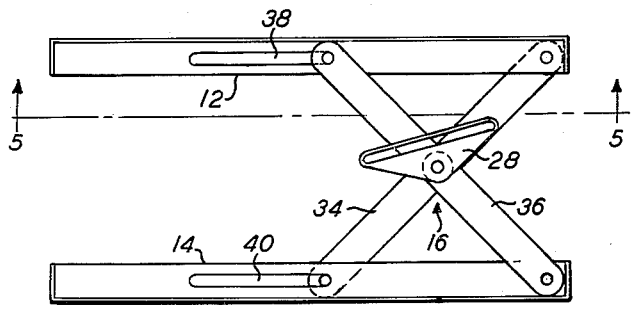
Figs. 3 and 4 are side elevational views of the upper and lower supports and separating lever system of the shock absorber shown before impact (Fig. 3) and during impact (Fig. 4).
Figure 4:
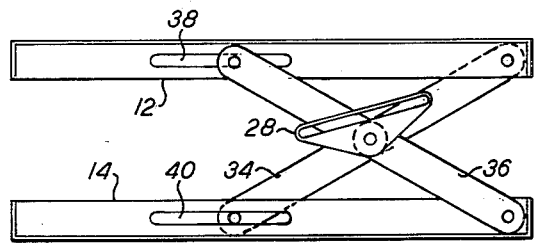

The horizontal lever systems 50 and 52 are connected between the cross bar 42 and the back edge of the upper support 12. The horizontal lever system 50 comprises the lever 54 having one end pivotally connected to the cross bar 42 and the other end free to move and a lever 53 pivotally connected between the mid-point of the lever 54 and the corner of the upper support 12. The horizontal lever system 52 is similarly constructed. Thus, during impact, as the upper support 12 descends toward the lower support 14, the vertical lever systems 16 and 18 compress (Figs. 3 and 4), moving the cross bar 42 (Fig. 2) toward the front of the shock absorber 10. This extends the horizontal lever systems 50 and 52 so that the free ends 54 and 56 of the levers move away from the center line of the upper support 12 during impact.

Figure 5:
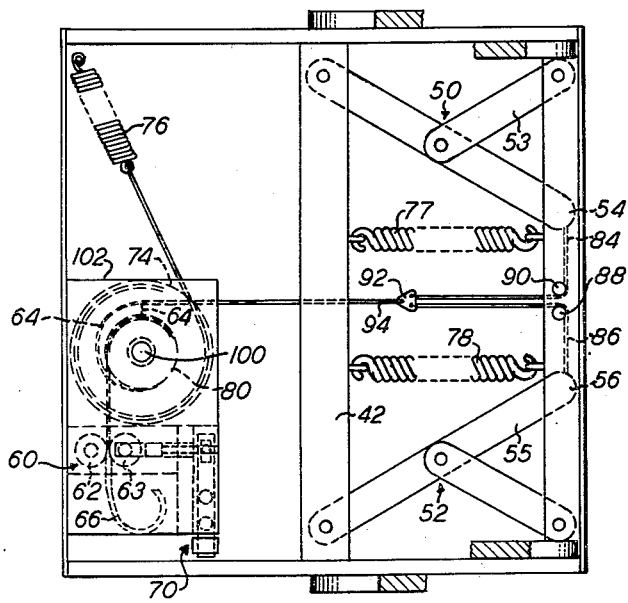
Fig. 5 is a bottom view of the upper support of the shock absorber showing part of the lever system, the variable lever arm (cam), the energy absorption device, the accelerometer, and part of the reset means.

Also mounted on the underside of the upper support 12 (Figs. 2 and 5) are: the energy absorption device 60 comprising the rollers 62 and 63 and the malleable metal bar 66; the accelerometer 70; the variable force means consisting of the cam 64 (Figs. 6 and 7); and reset means including the reset reel 74 and spring 76, the support return springs 77 and 78, and the take up reel 80 around which the metallic bar 66 is wound during impacts.

Figure 6:
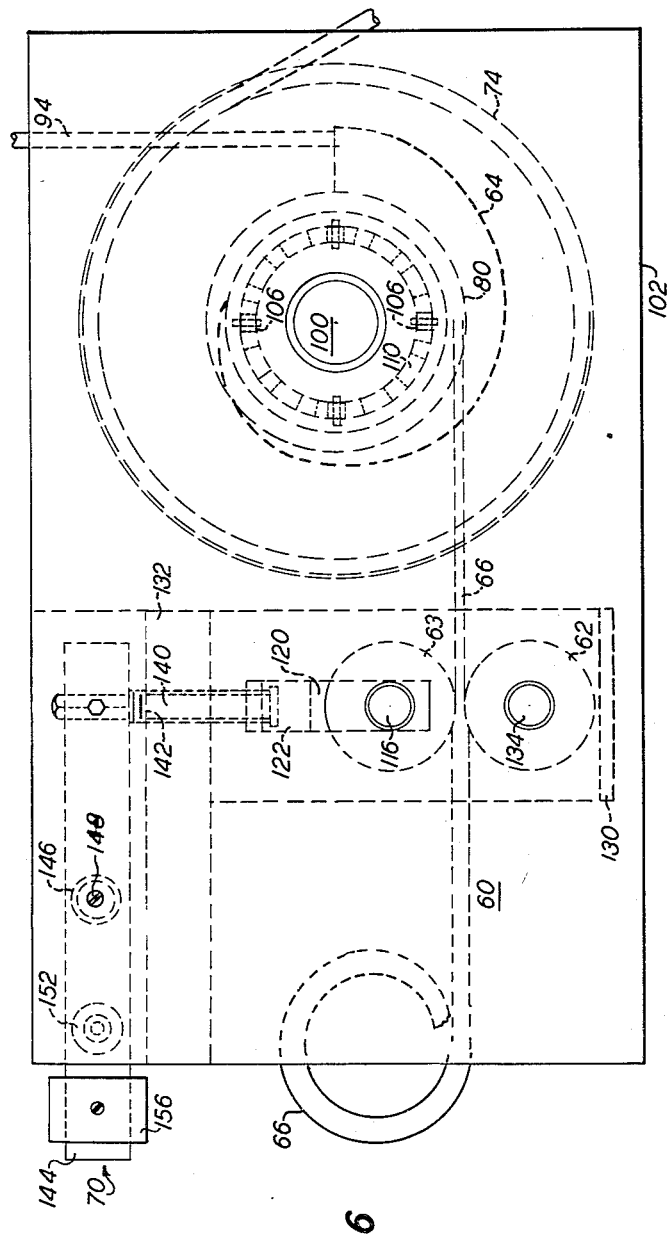
Fig. 6 is an enlarged plan view of the variable lever arm (cam), the energy absorption means and the accelerometer.
Figure 7:
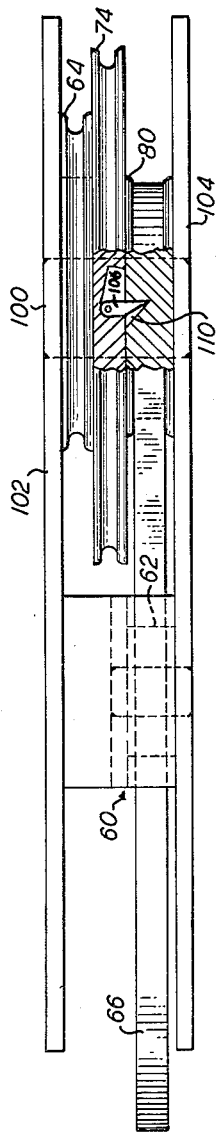
Fig. 7 is a side elevational view partly broken away of the apparatus of Fig. 6 illustrating, in particular, the ratchet device portion of the reset means.

The details of the variable force and reset means are shown in Figs. 6 and 7 and comprise the cam 64, the reset reel 74, and the take up reel 80 concentrically mounted on the axle 100 which is connected between the upper axle plate 102 and the lower axle plate 104. The cam 64 is pinned to the reset reel 74 so that both are turned together. The reset reel 74 rotates the take up reel 80 by means of a ratchet device consisting of pawls 106 pivotally connected in grooves in the reset reel 74. The pawls 106 fit into ratchet teeth 110 of the take up reel 80 during impact and ride over the ratchet teeth 110 during reset of the energy absorption device 60 between impacts. The take up reel 80 is designed to rotate only in the wind direction. Thus, when cam 64 is rotated during impact in the wind direction, the reset reel 74 and the take up reel 80 are rotated a corresponding amount to pull the malleable metallic bar 66 between the rollers 62 and 63. Between impacts the reset reel 74 is pulled in the opposite direction by the spring 76 (Figs. 2 and 5) which was stressed during impact, but due to the ratchet device the take up reel 80 is not rotated since the pawls 106 slide over the ratchet teeth 110 of the take up reel 80. Meanwhile the support return springs 77 and 78 return the upper support 12 to its original position by pulling on the cross bar 42.

Figure 8:
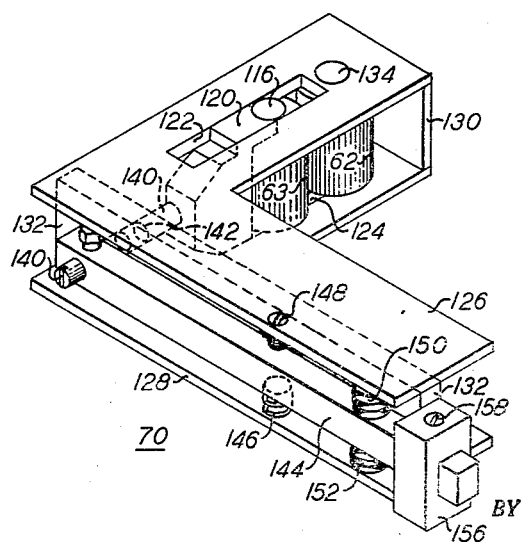
Fig. 8 is a perspective view of the accelerometer, and the rollers of the energy absorption device.

The amount of energy absorbed is a function of the spacing of the rollers 62 and 63 (Fig. 8). The spacing between the rollers 62 and 63 is controlled by the accelerometer 70. The roller 63 turns on the axle 116 which is mounted in the yoke 120. The yoke 120 slides in the channels 122 and 124 in the corresponding upper and lower plates 126 and 128. The upper and lower plates 126 and 128 are separated by the plates 130 and 132 to make a rigid unitary structure. The roller 62 rotates on the axle 134 in holes in the upper and lower plates 126 and 128.

The spacing between the rollers 62 and 63 is changed by sliding the yoke 120. This is accomplished by turning the threaded screw 140 which turns in a hole 142 in the plate 132. The threaded screw 140 may be turned by a downward movement of the accelerometer arm 144 which is attached to the threaded screw 140. The accelerometer arm 144 is positioned between the upper and lower plates 126 and 128 between the spring 146 and the set screw 148. In addition, upper and lower interconnected oil filled metallic bellows 150 and 152 connected between the accelerometer arm 144 and the corresponding upper and lower plates 126 and 128 dampen very high frequency movement of the accelerometer arm 144 during impact. A weight 156 is slideable on the accelerometer arm 144 and fixed in position by the set screw 158. The accelerometer 70 and the roller assembly of the energy absorption device 60 are mounted between the upper and lower plates 102 and 104 (Figs. 6 and 7) and positioned so that the malleable metallic bar 66 connected to the take up reel 80 passes between the rollers 62 and 63.

Cables 84 and 86 (Figs. 2 and 5) are connected from the free ends 54 and 56 of the horizontal lever systems 50 and 52 via the pulleys 88 and 90 to the shackle 92. Shackle 92 is connected via the cable 94 to the cam 64. Thus, during impact, as the upper support 12 moves toward the lower support 14, the cable 94 rotates the cam 64, which in turn rotates the reset reel 74 and causes the take up reel 80 to pull the malleable metallic bar 66 between the rollers 62 and 63 thus deforming the malleable bar so as to absorb the energy due to the downward movement of the upper support 12 with the pilot or occupant of the aircraft, without recoil or rebound. There is no recoil or rebound because the deformation of the malleable metallic bar 66 is permanent.

The operation of the shock absorber 10 will be described in connection with the conditions of a typical crash landing of a high speed jet aircraft.

Figure 9:
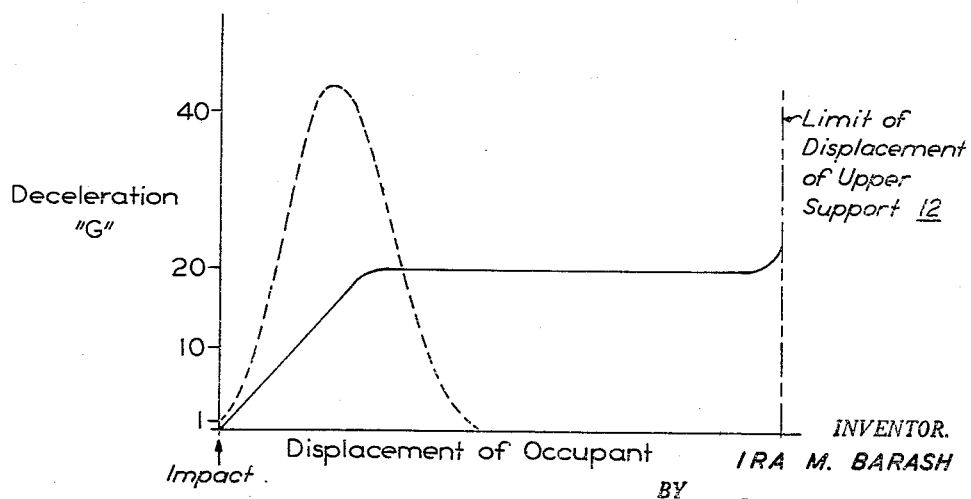
Fig. 9 is a curve illustrating the change of deceleration produced by the shock absorber during a typical impact compared with the deceleration curve of an unaltered impact.

Assuming no shock absorber, there is, initially, a high vertical velocity which suddenly changes and is rapidly reduced to zero upon impact with the ground. Although some of the aircraft structure is deformed, both the rate of onset of deceleration and the peak value are great enough to injure the pilot. This condition is illustrated by the dotted line portion of the graph in Fig. 9. In accordance with the invention, the shock absorber 10 provides a greater distance for deceleration and tends to maintain the rate of onset and the ultimate level of deceleration within tolerable limits. The maximum rate of onset tolerable is about four hundred G per second. (G is the acceleration of gravity, i.e., thirty-two feet per second per second.) The maximum tolerable deceleration is about twenty to twenty-five G. Thus, upon impact the deceleration increases gradually to reach a maximum tolerable level which thereafter tends to be maintained constant by the accelerometer 70. The rate of onset is controlled by the shape of the cam 64 which at the beginning of the impact provides a relatively longer lever arm (Figs. 6 and 9) to rotate the take up reel 80 at a slower angular rate which is increased gradually. Therefore, the malleable metallic bar 66 is drawn between the rollers 62 and 63 at a gradually increasing rate to gradually absorb a predetermined amount of energy, thus controlling the rate of onset. As the maximum tolerable deceleration is reached, the lever arm presented by the rotating cam 64 becomes constant to provide a relatively constant deceleration. Any tendency to exceed the maximum tolerable deceleration is prevented by the accelerometer 70 which is mounted on the upper support 12 and therefore acts as part of a mechanical feedback (servo) system to increase the spacing of the rollers 62 and 63 as the deceleration begins to exceed the maximum tolerable deceleration. More particularly, the deceleration above a predetermined amount acting on the mass 156 on the accelerometer arm 142 functions to increase the spacing between the rollers 62 and 63 by rotating the threaded screw 140 and sliding the yoke 120 and roller 63 away from roller 62.

The accelerometer arm 142 (Fig. 6) is held in position by the set screw 148 and spring 146. The spring 146 is preloaded so that it does not compress any further until the accelerometer experiences more than a predetermined decelerative force. The set screw 148 prevents the accelerometer arm 142 from moving too far in the opposite direction. Hence, the maximum tolerable deceleration tends to be maintained but not exceeded. Therefore, all of the energy required to be absorbed in order to stop the downward movement of the pilot is absorbed without tending to exceed the maximum tolerable deceleration or rate of onset of deceleration. Further, under this condition of maximum tolerable rate of onset and deceleration, the maximum amount of energy is absorbed in the amount of displacement available between the pilot and the bottom of the ejection seat as represented by the spacing of the upper and lower supports 12 and 14. Thus, there is no damage to the lower parts of the vertebral column of the pilot during the first and successive impacts.

The first impact usually slows the flying speed of the aircraft down enough so that the lift due to the forward speed of the aircraft is lost. Therefore, the second impact or bounce is usually worse than the first. However, in accordance with the invention, the energy required to be absorbed during subsequent impacts to prevent injury is absorbed by the energy absorption device 60 which is automatically reset between impacts. This is accomplished as follows: At the end of the first impact (with the upper and lower supports 12 and 14 close together) the springs 76, 77 and 78 are stressed due to rotation of the reset reel 74 and the movement of the cross bar 42.

As the springs 76, 77 and 78 return to their unstressed condition, they rotate the reset reel 74 which returns the cam 64, the upper and lower supports 12 and 14, and the horizontal and vertical lever systems to their initial pre-impact position without rotating the take up reel 80. Therefore, the energy produced by each subsequent impact is absorbed by the energy absorption device 60 and only a small portion of the total energy is used to stress the springs 76, 77 and 78. If the initial velocity is so high that damage to the pilot cannot be avoided due to the restricted amount of energy absorbing space between the pilot and the floor, the shape of the cam 64 tends to minimize the eventual damage. As the upper support 12 nears the lower support 14, the shape of the cam 64 provides a smooth rate of change of deceleration (Fig. 9) which does not exceed the tolerable rate of onset so that the damage caused by the final deceleration upon impact is minimized.

It should be noted that various features of the shock absorber may readily be modified in accordance with other embodiments of the invention. Thus, the basic energy absorption device and associated equipment mounted on the upper support 12 may be connected to the ejection seat 22 so that the deceleration of the whole ejection seat 22 is controlled directly. Further, the illustrated embodiment may readily be installed beneath the passenger seats of a passenger plane or be built in to a regular seat supporting structure for the pilot of the aircraft. Also, the variable lever arm function of the cam 64 could be duplicated by various other forms of compound lever systems, similarly governing the rate of onset. The energy absorption device 70 can be replaced by other well known types of energy absorbing device, such as friction brakes, hydraulic pistons, wire drawing devices, metal shearing devices, etc. However, none of these would be as desirable primarily because the energy absorption device 70 may readily be controlled. Further, the malleable metallic bar 66 could be made in the form of a closed loop which, after being forced between the rollers 62 and 63, could thereafter be reformed into its original shape by a second pair of rollers positioned perpendicular to the first set and placed after them. Finally, there are many well known ratchet devices which could be used in place of the one described herein.

Therefore, the shock absorber 10 takes the following factors into account in order to prevent or minimize the chances of back injuries due to crash landing of high speed aircraft:

(1) The maximum deceleration is maintained at or below the maximum tolerable rate;
(2) The rate of onset is maintained at or below the maximum tolerable rate;
(3) The available space between the occupant and the floor of the aircraft is best utilized to absorb the maximum amount of energy;
(4) This energy is irreversibly absorbed, hence there is no violent reaction, rebound or recoil; and
(5) All of these factors are influenced during repeated impacts.

Therefore, an improved shock absorber system has been provided which safely absorbs the shock which results from the impact of a body initially moving at a relatively high speed. In addition, means are provided for maintaining the lap belt of the pilot or occupant tight as his seat depresses in order to prevent damage due to forced movements of his body. The shock absorber may readily be designed to fit within the ejection seat of existing aircraft as well as being included in the design of future aircraft seats. The deceleration produced by the shock absorber is, up to a limit, independent of initial velocity of the aircraft upon impact and independent of the weight of the occupant. It is also free of reaction, rebound or recoil. Further, the shock absorber does not require an outside power source, is very convenient to use, is easily installed and self-contained, is relatively low in cost and requires little or no servicing or periodic checking.

Similar problems solved by the invention arise in rapid upward acceleration such as occurs during the take off of jet and rocket aircraft or the upward ejection of a pilot from a disabled high speed aircraft. The shock absorber functions equally well for these purposes.

While the invention has been described primarily as a device for preventing human injury, the invention is equally useful in preventing structural damage to parts of any high speed mobile craft, device or mechanism, whether it be an aircraft or any other type of high speed body, whether in acceleration or deceleration.

Although the invention has been described in detail in connection with a single preferred embodiment, it will be apparent that many modifications and changes may be readily made without departing from the spirit and scope of the invention.

What is claimed is:

1. A shock absorber comprising a pair of support elements, resilient means connected between said support elements to maintain said support elements in a predetermined spaced relation, energy absorption means associated with one of said support elements to absorb energy generated by movement together of said support elements, said energy absorption means comprising a malleable member and means for drawing said malleable member when said support elements move together, said resilient means tending to return said support elements to said predetermined spaced relation after movement, and reset means associated with said energy absorption means to enable said energy absorption means to absorb energy generated by a subsequent movement together of said support elements.

2. The shock absorber of claim 1 wherein said malleable member is a malleable metallic member.

3. A shock absorber comprising a pair of support elements, resilient means connected between said support elements to maintain said support elements in a predetermined spaced relation, energy absorption means associated with one of said support elements to absorb energy generated by movement together of said support elements, said resilient means tending to return said support elements to said predetermined spaced relation after movement, and reset means associated with said energy absorption means to enable said energy absorption means to absorb energy generated by a subsequent movement together of said support elements, said energy absorption means comprising material drawing means, and variable force means connected between one of said support elements and said material drawing means to vary the force applied to said material drawing means in accordance with a predetermined function when said support elements move together.

4. The shock absorber of claim 3 wherein said material drawing means is metal drawing means.

5. The shock absorber of claim 4 wherein said metal drawing means comprises a pair of spaced rollers and a malleable metallic bar adapted to be drawn between said rollers, said pair of spaced rollers and said malleable metallic bar being associated with said one of said support elements.

6. The shock absorber of claim 5 including accelerometer means associated with said rollers to vary the spacing of said rollers depending on the acceleration of said support elements together.

7. A shock absorber comprising a pair of support elements, resilient means connected between said support elements to maintain said support elements in a predetermined spaced relation, energy absorption means associated with one of said support elements to absorb energy generated by movement together of said support elements, said energy absorption means comprising a permanently deformable member to absorb energy when being deformed, said resilient means tending to return said support elements to said predetermined spaced relation after movement, and reset means associated with said energy absorption means to enable a nondeformed portion of said permanently deformable member of said energy absorption means to absorb energy generated by a subsequent movement together of said support elements.

8. The shock absorber of claim 7 including variable force means connected between said energy absorption device and one of said support elements to vary the force applied to said energy absorption means depending on the amount of displacement together of said support elements.

9. A shock absorber comprising a support structure, movable support element connected to said support structure, means for controlling the deceleration of said support element when moved, and means for controlling the rate of change of deceleration of said support element when moved, said last named means comprising a cam associated with said support element and shaped in accordance with a predetermined function.

10. The shock absorber of claim 8 wherein said variable force means comprises a cam associated with said one of said support elements and adapted to rotate, said cam being shaped to vary the force applied to said energy absorption means depending on the amount of displacement together of said support elements for controlling the rate of change of deceleration of one of said support elements.

11. The shock absorber of claim 8 wherein said variable force means comprises a cam adapted to rotate when said support elements move together, said cam being associated with said one of said support elements.

12. The shock absorber of claim 8 wherein said variable force means comprises a rotatable cam shaped in accordance with a predetermined function and rotated by a cable which is moved when said support elements move together, said rotatable cam being associated with said one of said support elements.

13. A shock absorber comprising a support structure, a movable element connected to said support structure, deceleration means to control the deceleration of said movable element, means to control the rate of change of deceleration of said movable element, and accelerometer means to control the amount of deceleration of said movable element.

14. A shock absorber comprising upper and lower support elements, a pair of vertical lever systems connected between said upper and lower support elements, a cross bar connected between said pair of vertical lever systems, a pair of horizontal lever systems each connected between said cross bar and said upper support element, a cam connected to said upper support element, connecting means including a cable and pulleys connected between said pair of horizontal lever systems and said cam, a malleable metallic bar, a pair of rollers connected to said upper support element and positioned to draw said malleable metallic bar, a take up reel mounted concentric with said cam and connected to said malleable metallic bar, a reset reel attached concentrically to said cam, spring means connected between said upper support element and said reset reel to maintain said cam, said reset reel and said upper and lower support elements in an initial position, ratchet means associated with said reset reel and adapted to rotate said take up reel when said cam rotates in a wind direction and to ride over said take up reel when said cam rotates in the opposite direction, whereby when said upper and lower support elements move together said lever systems and connecting means rotate said cam in a wind direction to pull said malleable metallic bar between said rollers, said spring means returning said upper and lower support elements, said cam and said reset reel to their initial position without turning said take up reel, and accelerometer means connected to one of said rollers to control the spacing of said rollers and therefore the amount of drawing of said malleable metallic bar during movement of said upper and lower support elements together.

15. A shock absorber comprising a support structure, a movable support element connected to said support structure, energy absorption means connected to said movable support element to absorb energy generated by movement of said movable support element, and reset means associated with said energy absorption means to enable said energy absorption means to absorb energy generated by a subsequent movement of said movable support element, said energy absorption means and said reset means comprising a cable, translating means to translate the movement of said support element to said cable, a cam attached to said cable, a ratchet device attached to said cam, drawing means, a malleable metallic member connected via said drawing means to said ratchet device, the movement of said cable rotating said cam and drawing said malleable metallic member through said drawing means in accordance with a variable force determined by the shape of said cam whereby the deceleration of said support element during movement changes at a predetermined rate to reach a given maximum deceleration, said ratchet device permitting said cam and cable to return to their initial position before a subsequent movement.

References Cited in the file of this patent

UNITED STATES PATENTS

| | | |
|---|---|---|
| 471,298 | Windland et al. | Mar. 22, 1892 |
| 2,011,243 | Griswold | Aug. 13, 1935 |
| 2,140,359 | Hanna | Dec. 13, 1938 |
| 2,227,717 | Jones | Jan. 7, 1941 |
| 2,375,377 | Mitereff | May 8, 1945 |
| 2,473,903 | Purifoy | June 21, 1949 |
| 2,488,858 | Franz | Nov. 22, 1949 |
| 2,587,121 | Deardorff et al. | Feb. 26, 1952 |
| 2,637,337 | Martin | May 5, 1953 |
| 2,641,307 | McKinney et al. | June 9, 1953 |
| 2,671,536 | Jurasevich | Mar. 9, 1954 |
| 2,680,472 | Hempe | June 8, 1954 |
| 2,682,931 | Young | July 6, 1954 |
| 2,716,561 | Beran | Aug. 30, 1955 |
| 2,798,539 | Johnson | July 9, 1957 |

FOREIGN PATENTS

| | | |
|---|---|---|
| 485,235 | France | Sept. 29, 1917 |
| 42,243 | France | Mar. 21, 1933 |
| 819,784 | Germany | Nov. 5, 1951 |